United States Patent
Zhu et al.

(10) Patent No.: US 12,277,055 B1
(45) Date of Patent: Apr. 15, 2025

(54) ADDRESS MAPPING FOR A MEMORY SYSTEM

(71) Applicant: Synopsys, Inc., Mountain View, CA (US)

(72) Inventors: Jun Zhu, San Jose, CA (US); Toshinao Matsumura, Yokohama (JP); Gokhan Gultoprak, Dublin (IE)

(73) Assignee: Synopsys, Inc., Sunnyvale, CA (US)

( * ) Notice: Subject to any disclaimer, the term of this patent is extended or adjusted under 35 U.S.C. 154(b) by 10 days.

(21) Appl. No.: 17/179,001

(22) Filed: Feb. 18, 2021

Related U.S. Application Data

(60) Provisional application No. 62/978,535, filed on Feb. 19, 2020.

(51) Int. Cl.
*G06F 12/06* (2006.01)

(52) U.S. Cl.
CPC ........ *G06F 12/06* (2013.01); *G06F 2212/656* (2013.01)

(58) Field of Classification Search
CPC .................. G06F 11/10; G06F 12/06
USPC ............ 711/206, 212, 202, E12.001, 1, 200, 711/E12.014
See application file for complete search history.

(56) References Cited

U.S. PATENT DOCUMENTS

| | | | | |
|---|---|---|---|---|
| 5,313,577 A * | 5/1994 | Meinerth | ................. | G09G 5/39 345/568 |
| 6,199,153 B1 * | 3/2001 | Razdan | .................... | G11C 8/00 711/212 |
| 8,264,903 B1 * | 9/2012 | Lee | ................... | G11C 11/40618 365/194 |
| 10,860,473 B1 * | 12/2020 | Gaddam | ............... | G11C 11/408 |
| 10,901,899 B2 * | 1/2021 | Sasanka | ............. | G06F 12/1009 |
| 2006/0031679 A1 * | 2/2006 | Soltis, Jr. | ............ | G06F 21/6281 713/182 |
| 2012/0005454 A1 * | 1/2012 | Waugh | ................ | G06F 12/1027 711/E12.001 |
| 2017/0060475 A1 * | 3/2017 | Lee | ........................ | G06F 3/0604 |
| 2017/0315924 A1 * | 11/2017 | Blount | .................... | G06F 12/10 |
| 2018/0239697 A1 * | 8/2018 | Huang | ................ | G06F 12/0246 |
| 2020/0159674 A1 * | 5/2020 | Morgan | .............. | G06F 12/1408 |

* cited by examiner

*Primary Examiner* — Gautam Sain
*Assistant Examiner* — Edward Waddy, Jr.
(74) *Attorney, Agent, or Firm* — Park, Vaughan, Fleming & Dowler LLP; Laxman Sahasrabuddhe

(57) ABSTRACT

Systems and methods for address mapping for a memory system are described. A system address that includes a first set of bits may be received. The first set of bits may be partitioned into at least a second set of bits and a third set of bits. A fourth set of bits may be determined based on the second set of bits. A memory address may be determined by using the third set of bits and the fourth set of bits.

10 Claims, 8 Drawing Sheets

(12) United States Patent
US 12,277,055 B1

ADDRESS MAPPING FOR A MEMORY SYSTEM

RELATED APPLICATION

This application claims the benefit of U.S. Provisional Application Ser. No. 62/978,535, filed on 19 Feb. 2020, the contents of which are herein incorporated by reference in their entirety for all purposes.

TECHNICAL FIELD

The present disclosure relates to memory systems. More specifically, the present disclosure relates to address mapping for a memory system.

BACKGROUND

Memory systems are widely used in electronics systems, including, but not limited to, computers, cell phones, and automotive systems. Examples of memory systems include, but are not limited to, double data rate (DDR) based memory systems.

A memory system may include multiple ranks of memory devices that are selected by a chip select (CS) signal. A memory address may have a hierarchical structure. For example, a memory device may include (1) multiple logical ranks that are addressed using a chip ID (CID), (2) each logical rank may include multiple bank groups that are addressed by their respective bank group (BG) number, (3) each BG may include multiple banks that are addressed by their respective bank address (BA), (4) each bank may include multiple rows that are addressed by their respective row number (ROW), and (5) each row may include multiple columns that are addressed by their respective column number (COL). Thus, a memory location may be specified using the 6-tuple {CS, CID, BG, BA, ROW, COL}.

SUMMARY

Embodiments described herein feature techniques and systems for address mapping for a memory system. A system address that includes a first set of bits may be received. The first set of bits may be partitioned into at least a second set of bits and a third set of bits. A fourth set of bits may be determined based on the second set of bits. For example, a table lookup may be performed by using the second set of bits to obtain the fourth set of bits. A memory address may be determined by using the third set of bits and the fourth set of bits.

In some embodiments, the second set of bits may be a contiguous set of most significant bits in the first set of bits.

In some embodiments, performing the table lookup by using the second set of bits to obtain the fourth set of bits may include using the second set of bits to index into a table, where a table entry corresponding to the second set of bits is the fourth set of bits.

In some embodiments, the fourth set of bits may include (1) a first subset of bits that indicates if the system address is valid, (2) a second subset of bits that indicates a type of memory, (3) a third subset of bits that is used to select a memory device, and (4) a fourth subset of bits that is used to create an input for an address map.

In some embodiments, determining the memory address by using the third set of bits and the fourth set of bits may include: combining the third set of bits and the fourth set of bits to obtain an address map input, providing the address map input to a set of address maps, and selecting an output of an address map in the set of address maps.

In some embodiments, combining the third set of bits and the fourth set of bits may include concatenating the third set of bits and the fourth set of bits.

In some embodiments, the output of the address map in the set of address maps may be selected based on a one or more bits of the fourth set of bits.

BRIEF DESCRIPTION OF THE FIGURES

The disclosure may be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
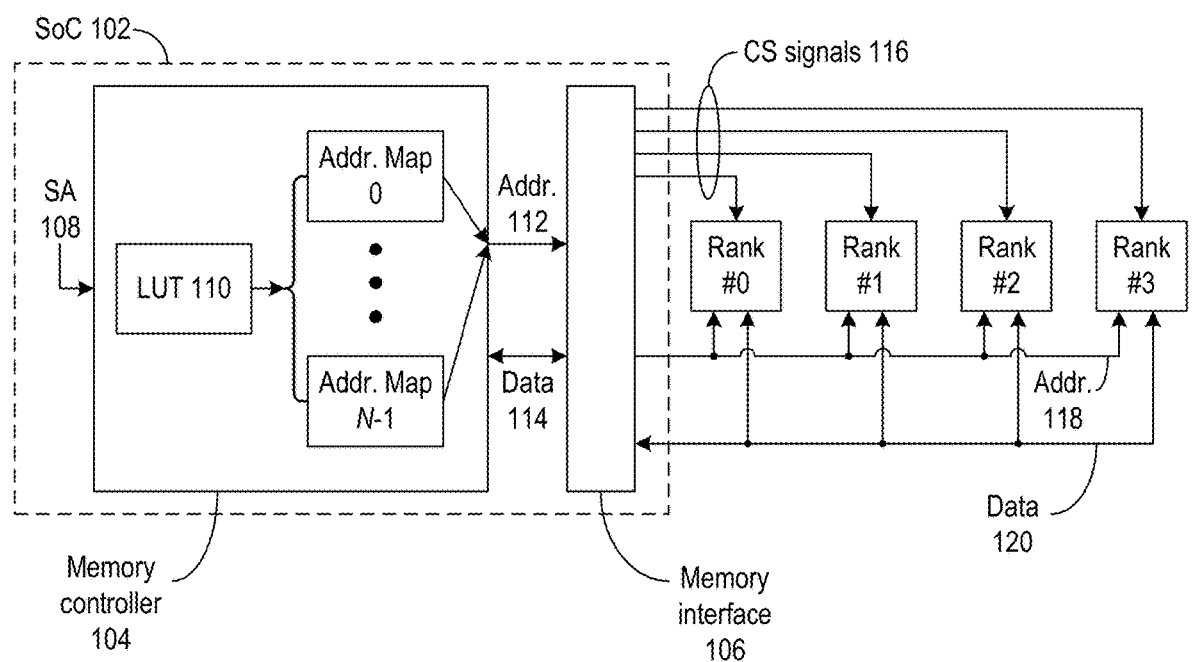
FIG. 1 illustrates a system in accordance with some embodiments described herein.

Aspects of the present disclosure relate to address mapping for a memory system. A system on chip (SOC) design may include: (1) a cache memory, which may operate at the central processing unit (CPU) clock rate, have a relatively higher cost, and have relatively lower capacity; (2) a main memory (which may include, but is not limited to, DDR memory), which may operate at a relatively higher clock rate (but less than the CPU clock rate), have a mid-range cost, and have a mid-range capacity; and (3) mass storage (which may include, but is not limited to, solid state drives, hard disk drives, and network storage), which may have low performance, low cost, and very high capacity.

The term "system address" may refer to the entire address space that is accessible by a processing unit (e.g., a CPU). The term "memory address" may refer to an address in a main memory, e.g., DDR memory. Different main memories may have different address ranges. For example, a main memory may support up to 4 ranks selectable using a CS value; each rank may have up to 16 logical ranks selectable using a CID value; each logical rank may have up to 8 bank groups selectable using a BG value; each bank group may have up to 4 banks selectable using a BA value; each bank may have up to 218 rows selectable using a ROW value; and each row may have up to 1024 columns selectable using a COL value. In this example, the memory address may be specified as {CS[1:0], CID[3:0], BG[2:0], BA[1:0], ROW [17:0], COL[9:0]}, where the notation CS[1:0]refers to a two-bit CS value which may have four possible values ("00," "01," "10," and "11").

A contiguous system address region may be mapped to a memory address region by a memory controller. For example, a memory controller may map a 40-bit system address (which may correspond to a 1 terabyte (TB) address space) to a 32-bit memory address (which corresponds to a 4 gigabyte (GB) address space). Specifically, the memory controller may map system address A[39:0] to {CS[1:0], CID[3:0], BG[2:0], BA[1:0], ROW[17:0], COL[9:0]}. A memory controller may implement address mappings that do not create address holes (i.e., all addresses in a contiguous region of system addresses have valid memory addresses).

Some mapping techniques use a "bit-allocation" or "bit_swapping" approach, which perform a "bit-to-bit" mapping. In "bit-to-bit" mapping approaches, each bit of a system address is mapped to a corresponding bit of the memory address. For example, the A[31] bit may map to the CS[0] bit, the A[17] bit may map to ROW[0] bit, and so forth.

Such "bit-to-bit" mapping approaches are not able to handle certain usage models. For example, a memory system may include four ranks, e.g., Rank 0 through Rank 3. Rank 0 and Rank 1 may be populated using a 1 GB memory device and a 3 GB memory device, respectively. In this example, a "bit-to-bit" mapping approach (e.g., a mapping approach that maps A[31] to CS[0]) does not work because the capacity of the 3 GB memory device is not an integer power of two (as opposed to 1 GB, 2 GB, 4 GB, etc., which are integer powers of two).

Additionally, the 1 GB and 3 GB devices may use different configurations, which may correspond to different addressing hierarchies. For example, the 1 GB memory device in Rank 0 may use the addressing scheme {BG[2:0], BA[0], ROW[15:0], COL[9:0]}, whereas the 3 GB memory device in Rank 3 may use the addressing scheme {BG[2:0], BA[1:0], ROW[16:0], COL[9:0]}. A "bit-to-bit" mapping approach cannot be used in this case because the two devices have different BA and ROW widths.

A memory module, e.g., a dual in-line memory module (DIMM), may be single-rank or dual-rank and may be inserted in a memory slot. A system with two DIMM slots can support up to two dual-rank DIMMs, i.e., a total of four ranks. However, some configurations may not be supported by "bit-to-bit" mapping approaches. For example, two single-rank DIMMs may not be supported because, in traditional techniques, Rank 0 and Rank 2 would be populated, but Rank 1 and Rank 3 would be empty. However, empty ranks create address holes (which are not allowed) in "bit-to-bit" mapping techniques. As another example, "bit-to-bit" mapping does not support mixing single-rank and dual-rank DIMMs, e.g., populating a single-rank DIMM in slot 0, and a dual-rank DIMM in slot 1. In this example, Rank 0, Rank 2 and Rank 3 are populated, but Rank 1 is empty. The empty rank creates an address hole (which is not allowed) in "bit-to-bit" mapping techniques.

In inline Error Correction Code (ECC), the ECC is stored in a reserved address space. When inline ECC is used with non-binary density devices, particular column addresses may be reserved for inline ECC, while particular row addresses may be reserved for non-binary density devices. In such situations, a flexible address mapping between the system address space and the memory address space may be required to create a usable contiguous address space. Some address mapping techniques may not provide such flexible address mapping. However, embodiments described herein can provide a flexible address mapping that can enable inline ECC to be used with non-binary density devices.

Embodiments described herein provide techniques and systems for address mapping for a memory system. Specifically, some embodiments map the system address to the memory address in two stages. In a first stage, a portion of the system address may be mapped using a lookup table. Next, in a second stage, a set of bit-to-bit address mappers may be used to determine the memory address. Specifically, the result of the table lookup may be used to create an input for the set of bit-to-bit address mappers, and to select a bit-to-bit address mapper from the set of bit-to-bit address mappers.

Advantages of embodiments described herein include, but are not limited to, allowing memory ranks to have memory sizes that are not supported by traditional memory mapping techniques, and allowing memory configurations that are not supported by traditional memory mapping techniques. Specifically, embodiments described herein can (1) support multiple ranks with different memory sizes, including sizes that are not an integer power of two, (2) support multiple ranks with different configurations, (3) support any ordering of populated ranks, (4) support mixed DIMMs, e.g., single-rank DIMMs in slot0 and slot1, a single-rank DIMM in slot0, and a dual-rank DIMM in slot1.

FIG. 1 illustrates a system in accordance with some embodiments described herein.

An integrated circuit (IC) design, e.g., SoC 102, may include memory controller 104, memory interface 106 (also referred to as "PHY"), and a set of memory devices, which are shown as Rank #0 through Rank #3. System address (SA) 108 may be received by memory controller 104, which may map system address 108 to memory address (addr.) 112. Next, memory address 112 may be provided to memory interface 106.

Memory interface 106 may generate chip select signals 116 and address signals 118 based on memory address 112. Chip select signals 116 may select a memory device, and address signals 118 may select a memory location in the selected memory device. Data 114, which is desired to be read from or written to the selected memory location, may be communicated between memory controller 104 and memory interface 106. Memory interface 106 may generate data signals 120 to read data 114 from or write data 114 to the selected memory location.

Memory controller 104 may include a lookup table 110 and multiple address maps, e.g., address maps 0 through N−1. In some embodiments, address maps 0 through N−1 may be bit-to-bit address maps. System address 108 may be used to perform a lookup using lookup table 110, and the result of the lookup may then be mapped to memory address 112 using address maps 0 through N−1.

Figure 2:
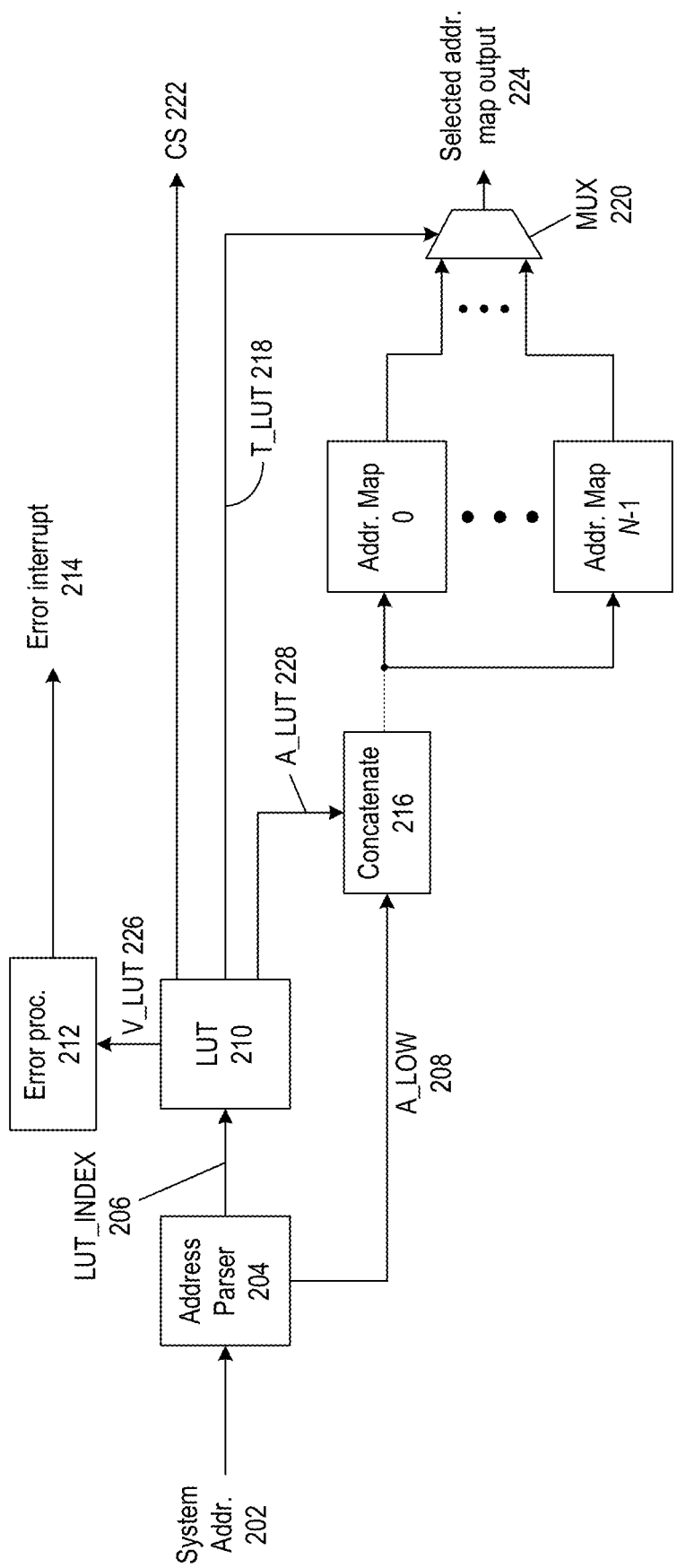
FIG. 2 illustrates circuitry to map a system address to a memory address in accordance with some embodiments described herein.

FIG. 2 illustrates circuitry to map a system address to a memory address in accordance with some embodiments described herein.

System address 202 may be provided to address parser 204, which may separate system address 202 into multiple sets of bits. In some embodiments, address parser 204 may separate system address 202 into a first set of bits (LUT_INDEX 206) and a second set of bits (A_LOW 208). The first set of bits (LUT_INDEX 206) may be used to index into lookup table (LUT) 210 and the second set of bits (A_LOW 208) may be used to form the input for the address maps 0 through N−1. The result of the lookup operation may be used to (1) determine if an error has occurred or (2) the memory address if no error has occurred.

For example, system address 202 may be 34-bits long, which may be represented as A[33:0], LUT_INDEX 206 may be the top four bits, i.e., A[33:30], and A_LOW 208 may be the bottom 30 bits, i.e., A[29:0]. In the above example, the LUT_INDEX 206 is four bits wide, and may be used to index into a 16-entry LUT 210. In this example, A_LOW 208 (which is A[29:0]) may be provided as the input to the address maps 0 through N−1. The result of the lookup operation may result in multiple subsets of bits, including, but not limited to, a first subset of bits (V_LUT 226), a second subset of bits (CS 222), a third subset of bits (T_LUT 218), and a fourth subset of bits (A_LUT 228).

For example, V_LUT 226 may be a single bit which may indicate whether the system address 202 is valid. If V_LUT 226 indicates that the system address 202 is not valid, error processing circuitry 212 may generate error interrupt 214. On the other hand, if V_LUT 226 indicates that the system address 202 is valid, then A_LUT 228 (which may be four bits wide) and A_LOW (which may be 30 bits wide) may be combined (e.g., using concatenation circuitry 216) to generate a 34-bit address. The 34-bit address may then be used as the input for address maps 0 through N−1. Each address map may generate a separate set of CID, BG, BA, ROW, and COL values. In other words, address map i may generate CID[i], BG[i], BA[i], ROW[i], COL[i], where 0≤i≤N−1. The outputs from the address maps may be provided as inputs to multiplexer 220. T_LUT 218 may be provided as a select input to multiplexer 220 to select the output of one of the address maps 0 through N−1. Chip select 222 and the selected address map output 224 may then be provided as the memory address (e.g., memory address 112 in FIG. 1).

Figure 3A:
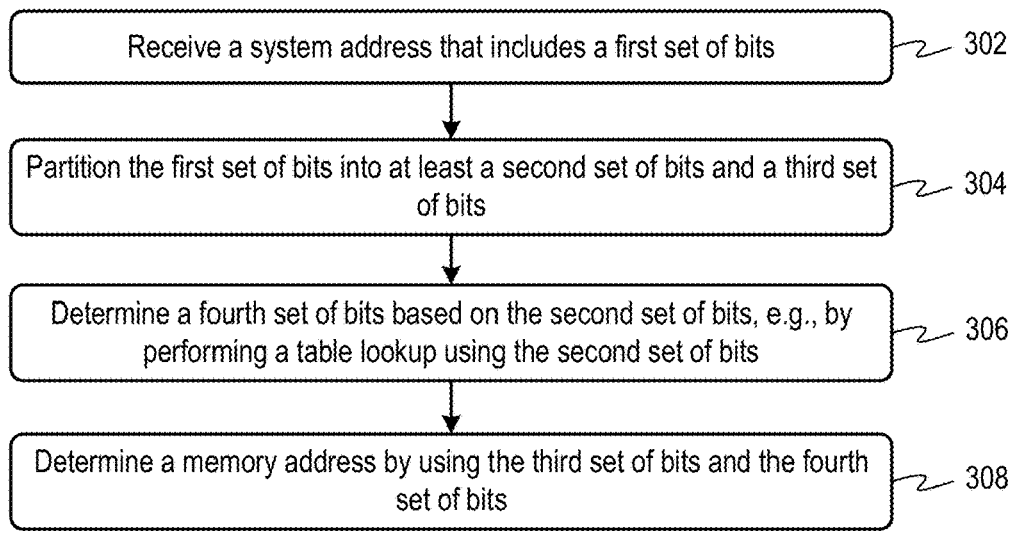
FIGS. 3A-3B illustrate a process for mapping a system address to a memory address in accordance with some embodiments described herein.
Figure 3B:
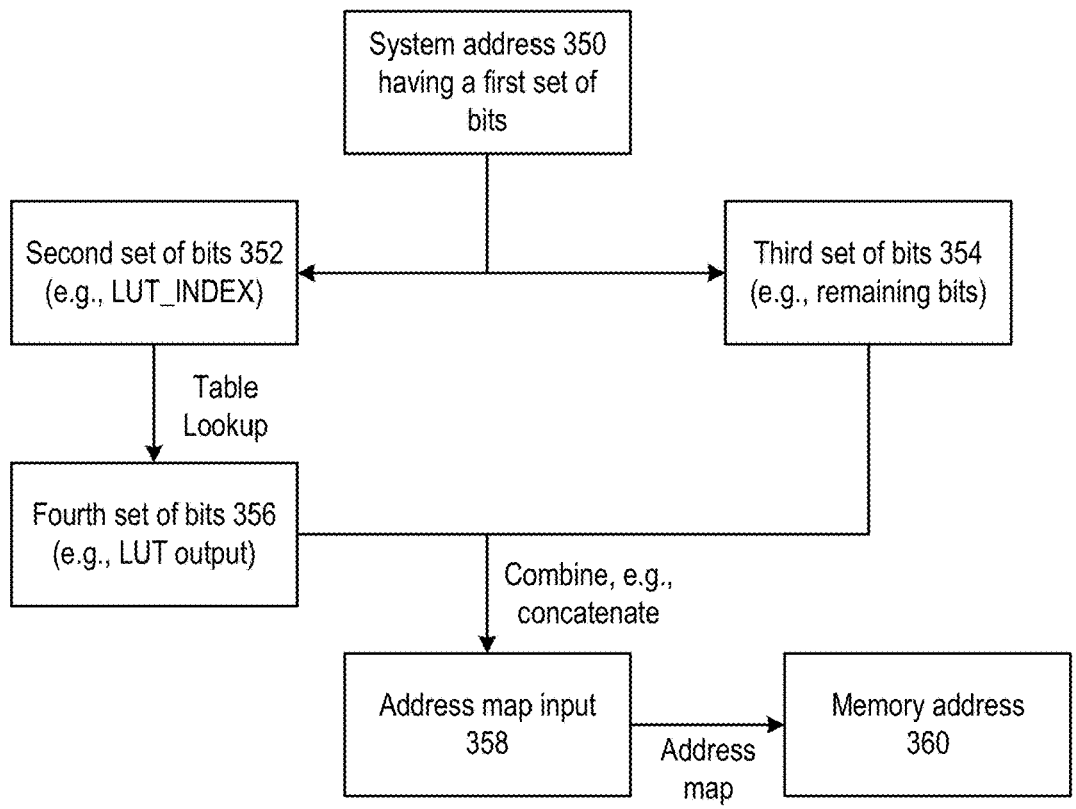

FIGS. 3A-3B illustrate a process for mapping a system address to a memory address in accordance with some embodiments described herein.

The process may begin by receiving a system address that includes a first set of bits (at 302). Next, the process may partition the first set of bits into at least a second set of bits and a third set of bits (at 304). In some embodiments, the second set of bits may be a contiguous set of most significant bits in the first set of bits. For example, as shown in FIG. 3B, system address 350 may be partitioned into second set of bits 352 (e.g., LUT_INDEX 206) and third set of bits 354 (e.g., remaining bits in the system address, i.e., A_LOW 208).

The process may then determine a fourth set of bits based on the second set of bits, e.g., by performing a table lookup using the second set of bits (at 306). In some embodiments, the second set of bits may be used to index into a table, where a table entry corresponding to the second set of bits is the fourth set of bits. In these embodiments, if the number of bits in the second set of bits is n, then a lookup table with $2^n$ entries can be supported. Conversely, if it is desired to support a lookup table with $2^n$ entries, then the second set of bits may include n bits. In some embodiments, the fourth set of bits may include (1) a first subset of bits that indicates if the system address is valid, (2) a second subset of bits that indicates a type of memory, (3) a third subset of bits that is used to select a memory device, and (4) a fourth subset of bits that is used to create an input for an address map.

Next, the process may determine a memory address by using the third set of bits and the fourth set of bits (at 308). In some embodiments, determining the memory address by using the third set of bits and the fourth set of bits may include: combining the third set of bits and the fourth set of bits to obtain an address map input, providing the address map input to a set of address maps, and selecting an output of an address map in the set of address maps. In some embodiments, combining the third set of bits and the fourth set of bits may include concatenating the third set of bits and the fourth set of bits. In some embodiments, the output of the address map in the set of address maps may be selected based on a one or more bits of the fourth set of bits.

For example, as shown in FIG. 3B, fourth set of bits 356 (e.g., A_LUT 228) may be obtained by performing a table lookup by using second set of bits 352 (e.g., LUT_INDEX 206). Next, the fourth set of bits (e.g., A_LUT 228) and the third set of bits (e.g., A_LOW 208) may be combined, e.g., concatenated, to form address map input 358. Address map input 358 may then be provided as input to a set of address maps (e.g., address maps 0 through N−1) and a result of a selected address map may be provided as memory address 360.

Figure 4:
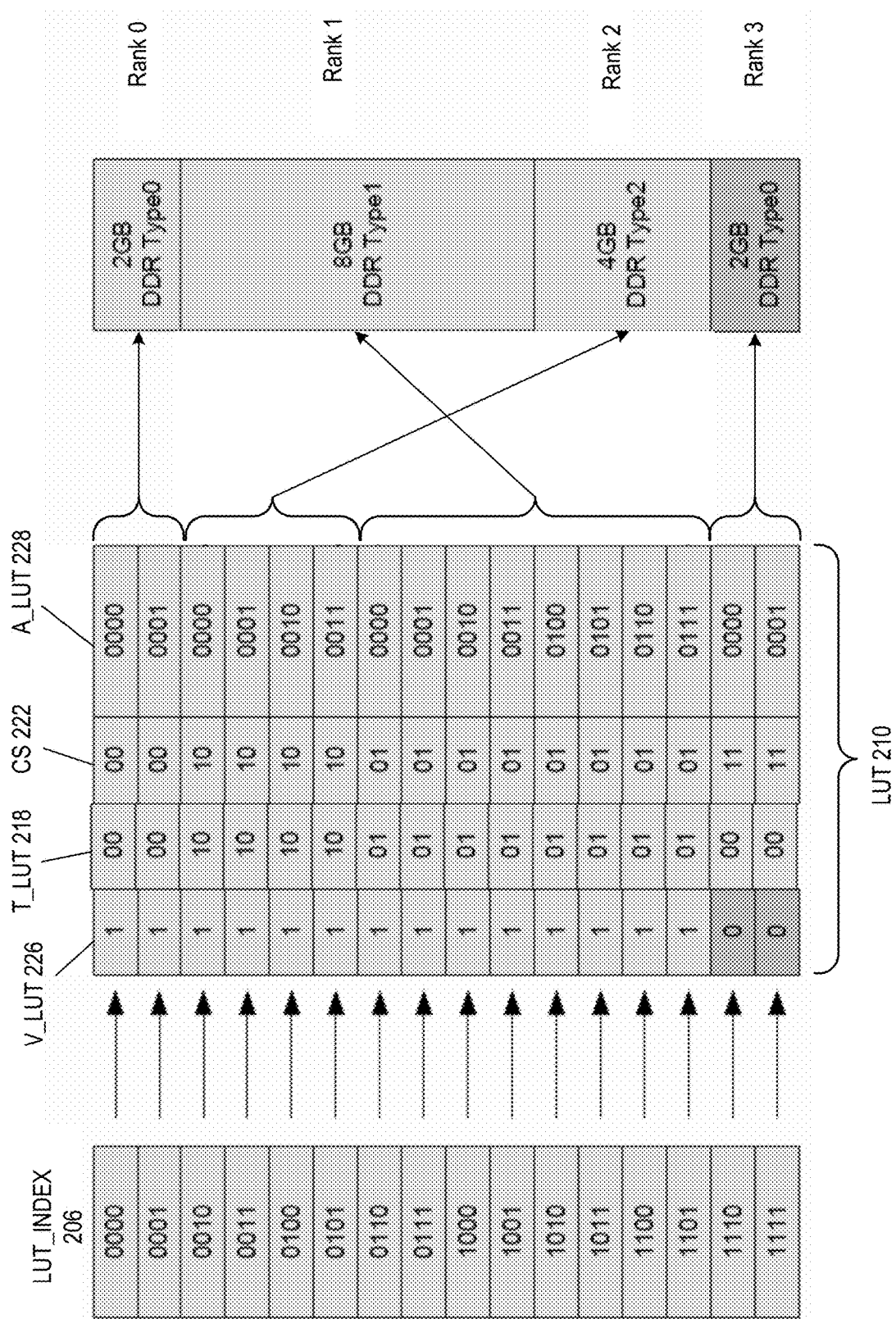
FIG. 4 illustrates an example of a system address to memory address mapping in accordance with some embodiments described herein.

FIG. 4 illustrates an example of a system address to memory address mapping in accordance with some embodiments described herein.

In the memory configuration shown in FIG. 4, four ranks (e.g., Rank 0 through Rank 3) may be populated with a total memory size of 16 GB. Three types of memory devices have been used in the four ranks, specifically, a 2 GB memory device (Type 0) in Rank 0, an 8 GB memory device (Type 1) in Rank 1, a 4 GB memory device (Type 2) in Rank 2, and a 2 GB memory device (Type 0) in Rank 3.

In the example implementation shown in FIG. 4, LUT_INDEX 206 may be used to index into LUT 210. Each row in LUT 210 may provide values for V_LUT 226, T_LUT 218, CS 222, and A_LUT 228. For example, the first row of LUT 210 (corresponding to index "0000") may provide values "1" for V_LUT 226, "00" for T_LUT 218, "00" for CS 222, and "0000" for A_LUT 228. These values may then be used to map to a memory address as shown in FIG. 4. Specifically, CS 222 may be used to select a memory device, and T_LUT 218 may be used to select an address map.

As shown in FIG. 4, embodiments described herein may allow (1) a low capacity memory device (2 GB in this example) to be placed in a low rank location (e.g., Rank 0 in this example), (2) three different memory types with different capacities to be mixed in same system, and (3) rank address regions to be swapped (e.g., Rank 2 has a lower system address region than Rank 1). Rank 3 may be in low power mode and may not be available for system access. Such situations may also be handled by embodiments described herein by using V_LUT 226, which is 0 (i.e., invalid) for Rank 3, indicating that Rank 3 is in low power mode and not available for system access.

Figure 5:
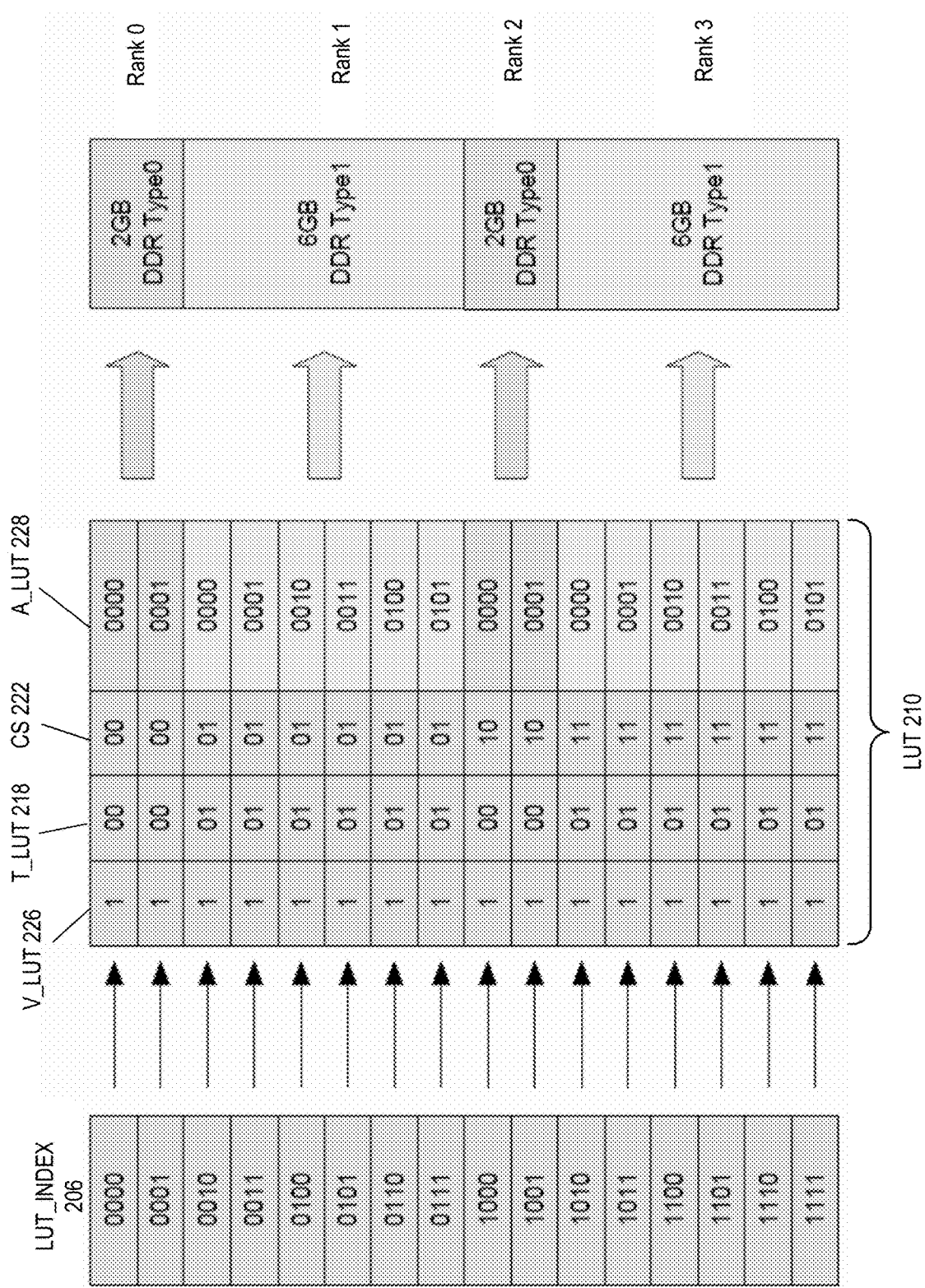
FIG. 5 illustrates an example of a system address to memory address mapping in accordance with some embodiments described herein.

FIG. 5 illustrates an example of a system address to memory address mapping in accordance with some embodiments described herein.

In the memory configuration shown in FIG. 5, four ranks (e.g., Rank 0 through Rank 3) may be populated with a total memory size of 16 GB. Two types of memories have been used in FIG. 5, specifically a 2 GB memory device (Type 0) in Rank 0, a 6 GB memory device (Type 1) in Rank 1, a 2 GB memory device (Type 0) in Rank 2, and a 6 GB memory device (Type 1) in Rank 3. LUT_INDEX 206 may be used to index into LUT 210. Each row in LUT 210 may provide values for V_LUT 226, T_LUT 218, CS 222, and A_LUT 228. CS 222 may be used to select a memory device, and T_LUT 218 may be used to select an address map.

As shown in FIG. 5, embodiments described herein may allow (1) a memory device that with a size that is not an integral multiple of two to be used (e.g., 6 GB memory device), and (2) a low capacity memory device (2 GB in this example) to be placed in a low rank location (e.g., Rank 0 in this example).

Figure 6:
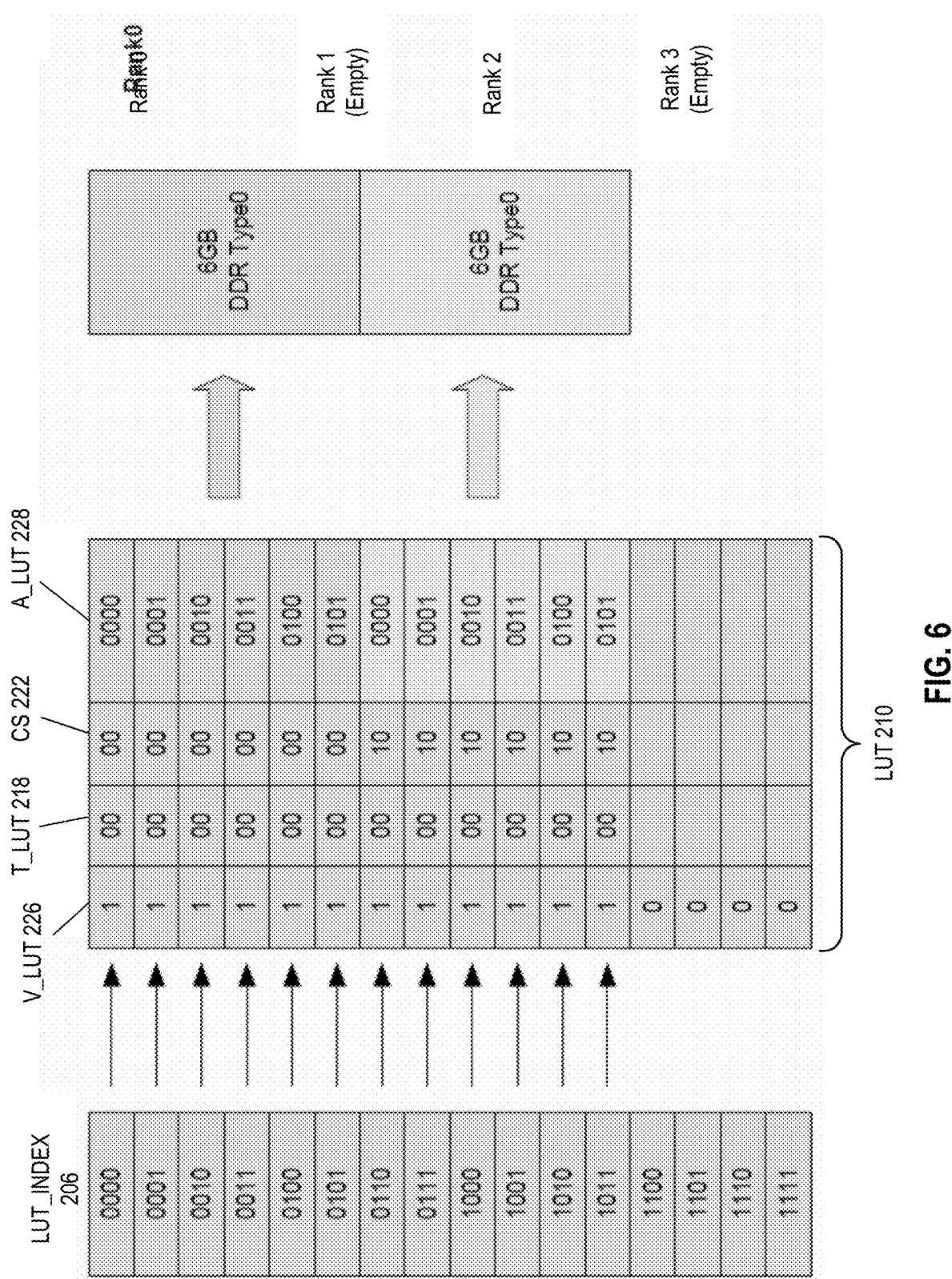
FIG. 6 illustrates an example of a system address to memory address mapping in accordance with some embodiments described herein.

FIG. 6 illustrates an example of a system address to memory address mapping in accordance with some embodiments described herein.

In the memory configuration shown in FIG. 6, two single-rank DIMMs (e.g., Rank 0 and Rank 2) may be populated with a total memory size of 12 GB. Some ranks may be empty, e.g., Ranks 1 and 3. A single type of memory has been used in FIG. 6, specifically a 6 GB memory device (Type 0) in Ranks 0 and 2. LUT_INDEX 206 may be used to index into LUT 210. Each row in LUT 210 may provide values for V_LUT 226, T_LUT 218, CS 222, and A_LUT 228. CS 222 may be used to select a memory device, and T_LUT 218 may be used to select an address map.

As shown in FIG. 6, embodiments described herein may allow (1) multiple single-rank DIMMs to be used with empty ranks, and (2) a memory device with a size that is not an integral multiple of two to be used (e.g., 6 GB memory device).

Figure 7:
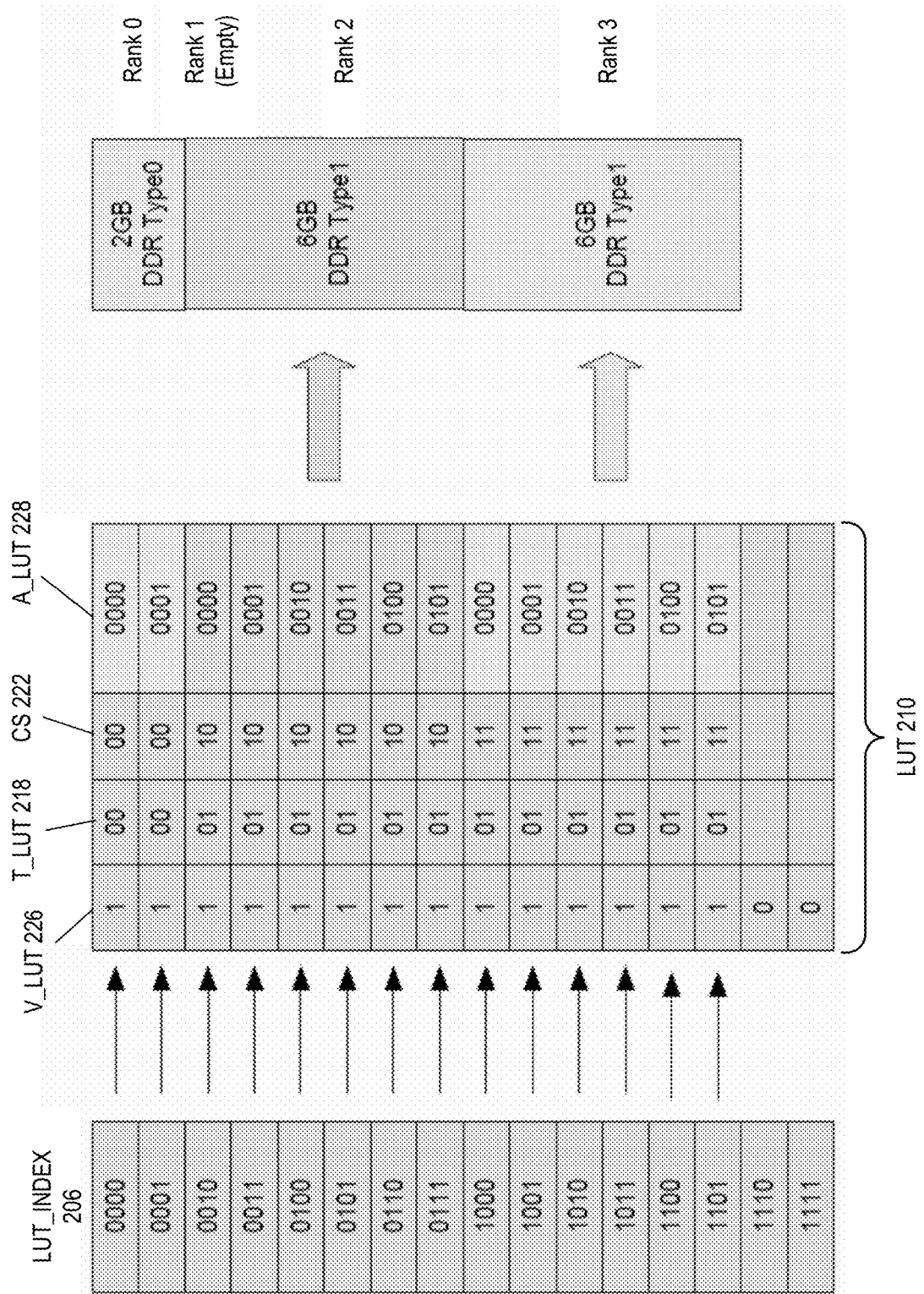
FIG. 7 illustrates an example of a system address to memory address mapping in accordance with some embodiments described herein.

FIG. 7 illustrates an example of a system address to memory address mapping in accordance with some embodiments described herein.

The memory configuration shown in FIG. 7 includes mixed DIMMs with a total memory size of 14 GB. Three ranks (e.g., Ranks 0, 2, and 3) are populated using two types of memories. Specifically, a 2 GB single-rank DIMM (Type 0) is used to populate Rank 0 with 2 GB and leave Rank 1 empty. A dual-rank 12 GB DIMM is used to populate Ranks 2 and 3 with 6 GB each. LUT_INDEX 206 may be used to index into LUT 210. Each row in LUT 210 may provide values for V_LUT 226, T_LUT 218, CS 222, and A_LUT 228. CS 222 may be used to select a memory device, and T_LUT 218 may be used to select an address map.

As shown in FIG. 7, embodiments described herein may allow (1) mixed DIMM usage, e.g., mixing single-rank and dual-rank DIMMs in different slots, (2) an empty rank (e.g., rank 1) in the middle, (3) a memory device with a size that is not an integral multiple of two to be used (e.g., 6 GB memory device), and (4) an odd number (three in this example) of populated ranks.

Figure 8:
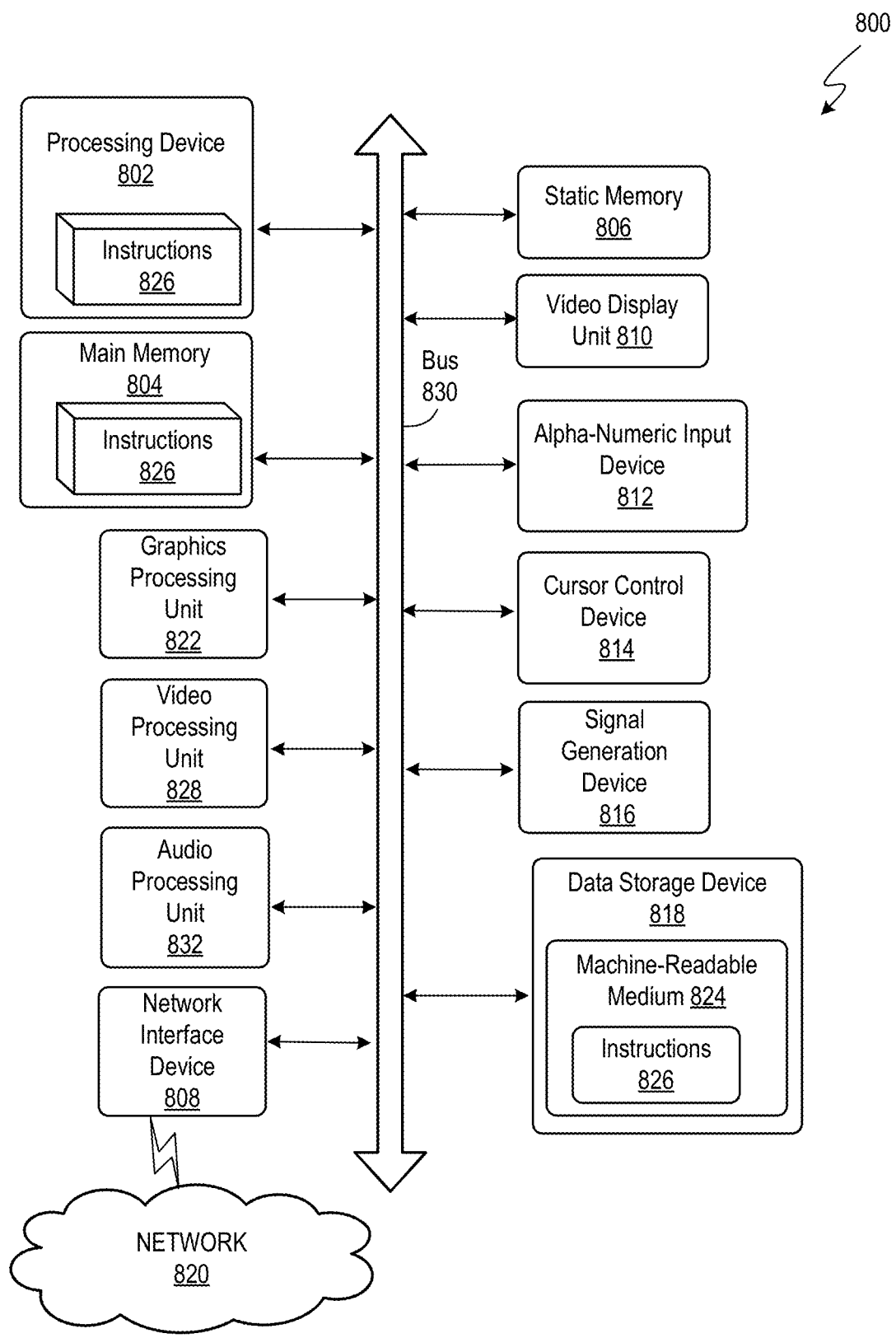
FIG. 8 illustrates an example machine of a computer system within which a set of instructions, for causing the machine to perform any one or more of the methodologies discussed herein, may be executed in accordance with some embodiments disclosed herein.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving a system address comprising a first set of bits, wherein the system address is to be mapped to a memory address which has fewer bits than the system address;
   partitioning, by using circuitry, the first set of bits into at least a second set of bits and a third set of bits;
   determining a fourth set of bits based on the second set of bits, wherein determining the fourth set of bits based on the second set of bits comprises using the second set of bits to index into a table to obtain the fourth set of bits, and wherein the fourth set of bits comprises a first subset of bits that is used as a chip select to select between memory ranks; and
   determining the memory address by using the third set of bits and the fourth set of bits, wherein determining the memory address by using the third set of bits and the fourth set of bits comprises:
      combining the third set of bits and the fourth set of bits to obtain an address map input;
      providing the address map input to a set of two or more address maps;
      generating, by the set of two or more address maps, a set of two or more address map outputs based on the address map input; and
      selecting an address map output from the set of two or more address map outputs based on one or more bits of the fourth set of bits.

2. The method of claim 1, wherein the second set of bits is a contiguous set of most significant bits in the first set of bits.

3. The method of claim 1, wherein the combining the third set of bits and the fourth set of bits comprises concatenating the third set of bits and the fourth set of bits.

4. The method of claim 1, wherein the fourth set of bits comprises one or more of (1) a second subset of bits that indicates if the system address is valid, (2) a third subset of bits that indicates a type of memory, and (3) a fourth subset of bits that is used to create an input for an address map.

5. A memory controller, comprising:
   first circuitry to partition a system address comprising a first set of bits into at least a second set of bits and a third set of bits, wherein the system address is to be mapped to a memory address which has fewer bits than the system address;
   second circuitry to determine a fourth set of bits based on the second set of bits, wherein the second circuitry uses the second set of bits to index into a table to obtain the fourth set of bits, and wherein the fourth set of bits comprises one or more of (1) a first subset of bits that indicates if the system address is valid, (2) a second subset of bits that indicates a type of memory, (3) a third subset of bits that is used to select a memory device, and (4) a fourth subset of bits that is used to create an input for an address map; and
   third circuitry to determine the memory address by using the third set of bits and the fourth set of bits, wherein the third circuitry comprises:
      fourth circuitry to combine the third set of bits and the fourth subset of the fourth set of bits to obtain an address map input;
      fifth circuitry to provide the address map input to a set of two or more address maps, wherein the set of two or more address maps generate a set of two or more address map outputs based on the address map input; and sixth circuitry to select an address map output from the set of two or more address map outputs based on one or more bits of the fourth set of bits.

6. The memory controller of claim 5, wherein the second set of bits is a contiguous set of most significant bits in the first set of bits.

7. The memory controller of claim 5, wherein the fourth circuitry concatenates the third set of bits and the fourth set of bits.

8. A memory system, comprising:
   a set of memory devices; and
   a memory controller to facilitate reading data from and writing data to the set of memory devices, the memory controller comprising:
      first circuitry to partition a system address comprising a first set of bits into at least a second set of bits and a third set of bits, wherein the system address is to be mapped to a memory address which has fewer bits than the system address;
      second circuitry to determine a fourth set of bits based on the second set of bits, wherein the second circuitry uses the second set of bits to index into a table to obtain the fourth set of bits, and wherein the fourth set of bits comprises (1) a first subset of bits that indicates if the system address is valid, (2) a second subset of bits that indicates a type of memory, (3) a third subset of bits that is used to select a memory device, and (4) a fourth subset of bits that is used to create an input for an address map; and
      third circuitry to determine the memory address by using the third set of bits and the fourth set of bits, wherein the third circuitry comprises:
         fourth circuitry to combine the third set of bits and the fourth set of bits to obtain an address map input;
         fifth circuitry to provide the address map input to a set of two or more address maps; and
         sixth circuitry to select an output of an address map in the set of two or more address maps.

9. The memory system of claim 8, wherein the second set of bits is a contiguous set of most significant bits in the first set of bits.

10. The memory system of claim 8, wherein the fourth circuitry concatenates the third set of bits and the fourth set of bits.

* * * * *